United States Patent
Cha (10) Patent No.: US 12,377,695 B1
(45) Date of Patent: Aug. 5, 2025

(54) SUSPENSION APPARATUS FOR VEHICLE

(71) Applicant: HYUNDAI MOBIS CO., LTD., Seoul (KR)

(72) Inventor: Seung Hwan Cha, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/009,630

(22) Filed: Jan. 3, 2025

(30) Foreign Application Priority Data

Apr. 1, 2024 (KR) ........................ 10-2024-0044143

(51) Int. Cl.
*B60G 7/00* (2006.01)

(52) U.S. Cl.
CPC ............. *B60G 7/001* (2013.01); *B60G 7/005* (2013.01); *B60G 2204/14* (2013.01); *B60G 2204/416* (2013.01)

(58) Field of Classification Search
CPC ............. F16C 11/0638; F16C 11/0628; F16C 11/0647; B60G 7/001; B60G 7/005; B60G 2204/14; B60G 2204/416
See application file for complete search history.

(56) References Cited

U.S. PATENT DOCUMENTS

| | | | | |
|---|---|---|---|---|
| 2,845,290 | A * | 7/1958 | Latzen .................. | B60G 7/005 403/77 |
| 5,066,160 | A * | 11/1991 | Wood .................. | F16C 11/0638 403/138 |
| 5,178,482 | A * | 1/1993 | Wood .................. | F16C 7/02 403/140 |
| 6,341,915 | B1 * | 1/2002 | Kammel ............... | F16C 11/0652 403/135 |
| 7,938,417 | B2 * | 5/2011 | Ersoy .................. | B60G 7/005 280/124.134 |
| 2003/0081989 | A1 * | 5/2003 | Kondoh .............. | F16C 11/0671 403/135 |
| 2004/0258462 | A1 * | 12/2004 | Budde ................. | F16C 11/0633 403/135 |
| 2004/0265047 | A1 * | 12/2004 | Budde ................. | F16C 11/0633 403/133 |
| 2007/0140783 | A1 * | 6/2007 | O'Bryan ............. | F16C 11/0638 403/122 |

(Continued)

FOREIGN PATENT DOCUMENTS

| KR | 10-2022-0145082 A | 10/2022 | |
|---|---|---|---|
| WO | WO-0233275 A1 * | 4/2002 | ............. F16C 11/06 |

OTHER PUBLICATIONS

Translation of WO-0233275-A1.*

*Primary Examiner* — Paul N Dickson
*Assistant Examiner* — Shams Dhanani
(74) *Attorney, Agent, or Firm* — Morgan, Lewis & Bockius LLP (57) ABSTRACT

A suspension apparatus for a vehicle includes an arm portion, a coupling portion bolted to the arm portion, a pipe portion provided in the coupling portion, a reinforcement portion provided on the pipe portion to reinforce rigidity of the pipe portion, a ball stud jointly coupled to the pipe portion, a first cover portion constrained by the reinforcement portion to be secured to the pipe portion and covering a first opening portion of the pipe portion, and a second cover portion constrained by the reinforcement portion to be secured to the pipe portion and covering a second opening portion of the pipe portion.

18 Claims, 12 Drawing Sheets

(56) References Cited

U.S. PATENT DOCUMENTS

| | | | |
|---|---|---|---|
| 2011/0150563 A1* | 6/2011 | Kuroda | F16C 11/0685 |
| | | | 29/527.1 |
| 2017/0051784 A1* | 2/2017 | Kanagawa | F16C 41/04 |
| 2019/0048922 A1* | 2/2019 | Sugg | F16C 11/06 |
| 2019/0055983 A1* | 2/2019 | Grannemann | F16C 11/0647 |
| 2019/0277334 A1* | 9/2019 | Sugg | F16C 11/0657 |
| 2020/0180377 A1* | 6/2020 | Kwon | F16C 11/0685 |
| 2021/0086575 A1* | 3/2021 | Jeong | B29C 45/14 |
| 2021/0229513 A1* | 7/2021 | Seethaler | B60G 7/02 |
| 2021/0270314 A1* | 9/2021 | Auquier | F16C 11/12 |
| 2022/0144031 A1* | 5/2022 | Piva | B60G 7/001 |
| 2023/0060485 A1* | 3/2023 | Chila | F16C 11/0647 |
| 2023/0220871 A1* | 7/2023 | Berger | F16C 11/0657 |
| | | | 403/135 |

* cited by examiner

SUSPENSION APPARATUS FOR VEHICLE

CROSS-REFERENCE TO RELATED APPLICATION

This application claims priority from and the benefit under 35 USC § 119 of Korean Patent Application No. 10-2024-0044143, filed on Apr. 1, 2024, in the Korean Intellectual Property Office, the entire disclosure of which is incorporated by reference for all purposes.

BACKGROUND

Field

Exemplary embodiments according to the present disclosure relate to a suspension apparatus for a vehicle, and more particularly, to a suspension apparatus for a vehicle that allows for reducing weight and decreasing the number of sub-components, thereby reducing costs.

Description of the Related Art

A suspension of a vehicle is a device designed to enhance ride comfort and driving stability, which stably supports the vehicle body from the wheels while reducing vibration transmitted from the wheels.

In general, a lower control arm is used as a device to connect the wheel to the vehicle body, and this lower control arm is equipped with bushings and ball joints. The bushing is coupled to the vehicle body, and the ball joint is connected to a knuckle of the wheel to support the wheel in conjunction with an upper control arm.

In the case of a lower control arm applied to a MacPherson strut suspension, the casing of the ball joint is bolted to a press-processed steel panel for assembly. However, the casing of the ball joint is made of steel for forming, strength, and durability, which results in increased weight.

In addition, when installing a dust cover on the casing of the ball joint, there is an issue of increasing the number of sub-components because a separate ring is used to secure the upper and lower ends of the dust cover to the casing of the ball joint. Therefore, these issues require improvement.

The related art of the present disclosure is disclosed in Korean Patent Application Publication No. 10-2022-0145082 (published on Oct. 28, 2022 and entitled "LOWER ARM APPARATUS FOR VEHICLE").

SUMMARY

Various embodiments of the present disclosure are directed to providing a suspension apparatus for a vehicle that is made of plastic to reduce weight.

In addition, the embodiments of the present disclosure are directed to providing a suspension apparatus for a vehicle that allows for decreasing the number of sub-components and processes, thereby reducing costs.

A suspension apparatus for a vehicle according to the present disclosure includes an arm portion, a coupling portion bolted to the arm portion, a pipe portion provided in the coupling portion, a reinforcement portion provided on the pipe portion to reinforce rigidity of the pipe portion, a ball stud jointly coupled to the pipe portion, a first cover portion constrained by the reinforcement portion to be secured to the pipe portion and covering a first opening portion of the pipe portion, and a second cover portion constrained by the reinforcement portion to be secured to the pipe portion and covering a second opening portion of the pipe portion.

The pipe portion may include plastic, and the reinforcement portion may include metal.

The reinforcement portion may include a reinforcement body portion integrally formed with the pipe portion and formed in an annular shape, a first bending deformation portion extending from a first end portion of the reinforcement body portion to protrude from the pipe portion and configured for bending and deformation, and a second bending deformation portion extending from a second end portion of the reinforcement body portion to protrude from the pipe portion and configured for bending and deformation.

The first bending deformation portion may be bent toward the first cover portion through a bending process to apply pressure to the edge of the first cover portion, and the second bending deformation portion may be bent toward the second cover portion through the bending process to apply pressure to the edge of the second cover portion.

The reinforcement body portion may have a slit hole.

A plurality of the slit holes may be spaced apart along a circumferential direction of the reinforcement body portion.

The first bending deformation portion and the second bending deformation portion may be chamfered.

The first cover portion may include a cover body portion that allows the ball stud to pass through and has an adjustable length, a first seating portion provided on one side of the cover body portion and seated on an outer peripheral surface of the ball stud to encase the ball stud, a second seating portion provided on an opposite side of the cover body portion and seated on the pipe portion, and a beading portion provided between the cover body portion and the second seating portion and recessed in a direction of a central axis of the cover body portion to allow insertion of the second bending deformation portion.

The coupling portion may include a coupling body portion that has a through-hole portion, and a nut portion accommodated in the through-hole portion and coupled to the coupling body portion.

The coupling body portion may include plastic, the nut portion may include metal, and the nut portion may be integrally formed with the coupling body portion.

The nut portion may include a nut body portion, a first flange portion provided on one side of the nut body portion and protruding in a radial direction of the nut body portion, and a second flange portion provided on an opposite side of the nut body portion and protruding in a radial direction of the nut body portion.

The ball stud may include a ball portion accommodated in the pipe portion, and a stud portion extending from the ball portion and being exposed from the pipe portion through the first opening portion.

The suspension apparatus for a vehicle may further include a ball seat portion interposed between the pipe portion and the ball portion and encasing the ball portion.

In the suspension apparatus for a vehicle, the coupling portion is made of plastic, which is bolted to the arm portion, and the plastic pipe portion and the metal reinforcement portion are insert injection molded. This increases the rigidity of the components while reducing the weight of the components, thereby improving fuel efficiency and energy efficiency.

In the suspension apparatus for a vehicle, the plastic coupling portion and the metal nut portion are insert injection molded, resulting in a reduction in the number of components and processes, thereby reducing manufacturing costs.

Furthermore, in the suspension apparatus for a vehicle, the first cover portion and the second cover portion may be firmly secured to the pipe portion through the bending process of the first bending deformation portion and the second bending deformation portion, which are provided in the reinforcement portion, and the watertightness of the pipe portion may be ensured.

DETAILED DESCRIPTION

Embodiments of a suspension apparatus for a vehicle according to the present disclosure will be described hereinafter with reference to the accompanying drawings. For clarity and convenience in description, thicknesses of lines, sizes of constituent elements, and the like may be illustrated in a non-exact proportion in the drawings. In addition, the terms used below are defined in consideration of the functions thereof in the present disclosure and may vary depending on the intention of a user or an operator or common practice. Therefore, these terms should be contextually defined in light of the present specification.

Figure 1:
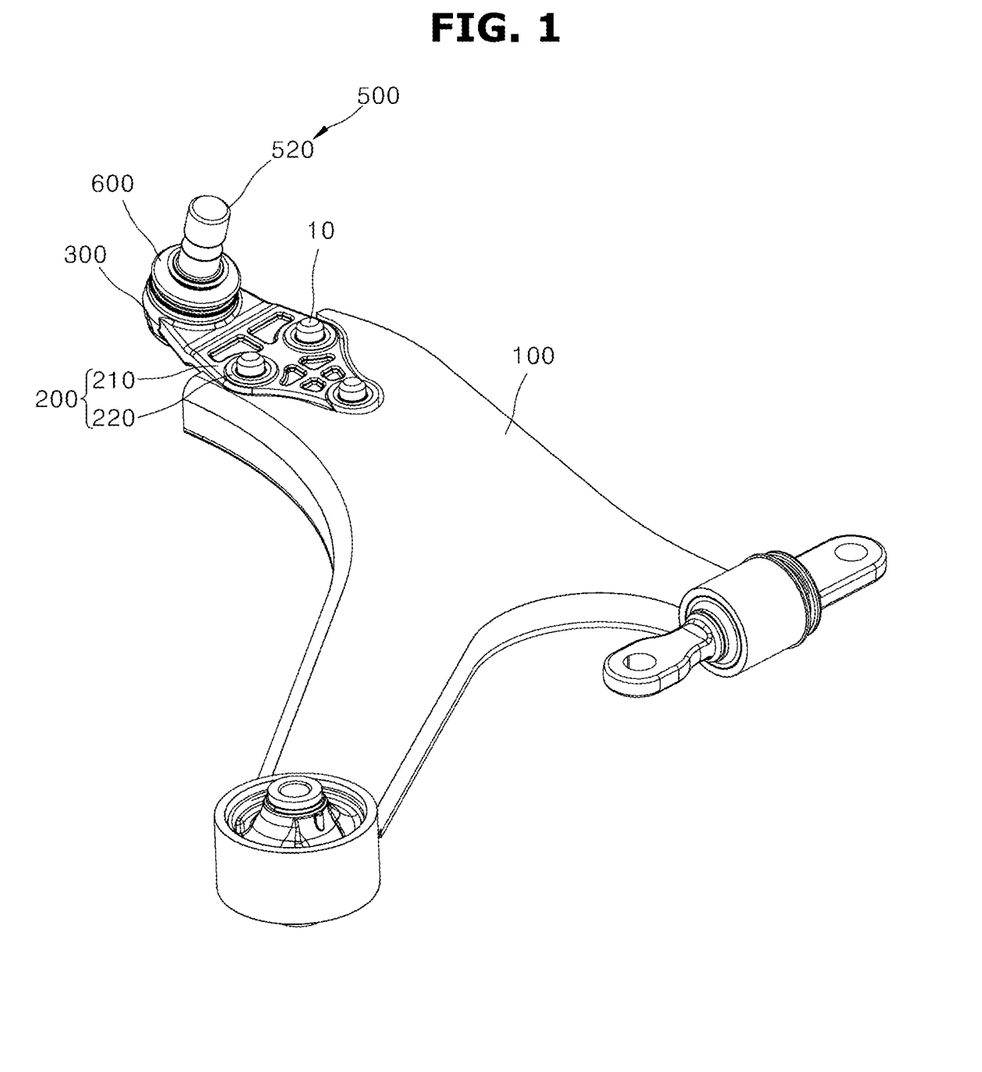
FIG. 1 is a perspective view showing a configuration of a suspension apparatus for a vehicle according to an embodiment of the present disclosure.
Figure 2:
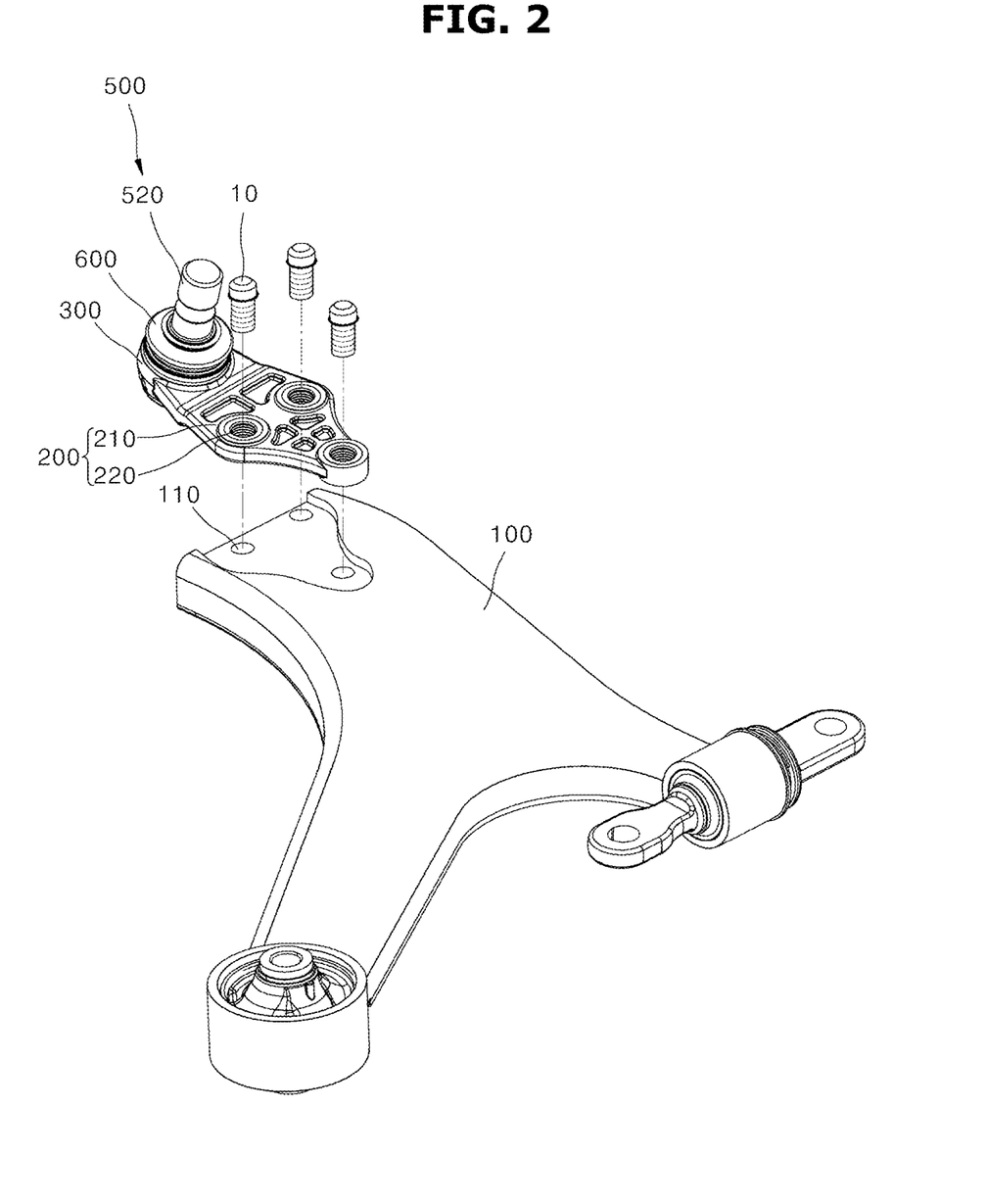
FIG. 2 is an exploded perspective view of FIG. 1.
Figure 3:
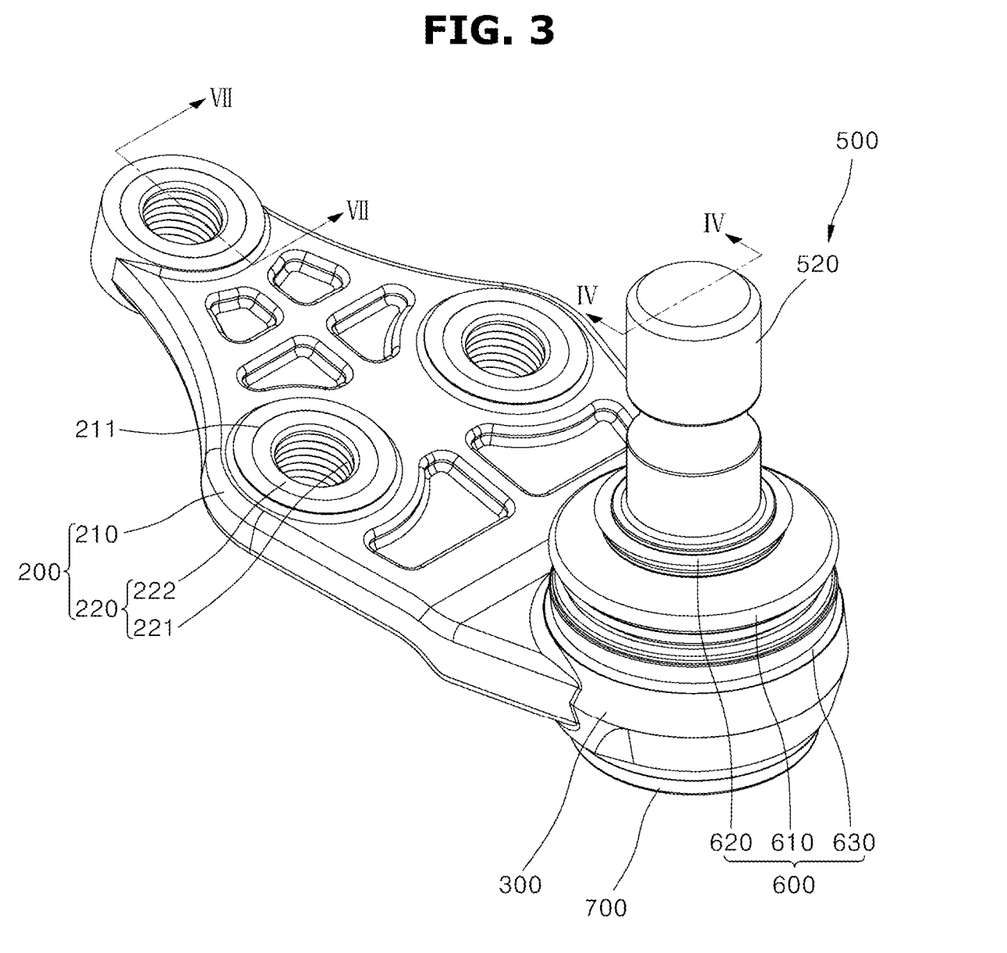
FIG. 3 is a perspective view showing a suspension apparatus for a vehicle according to an embodiment of the present disclosure.
Figure 4:
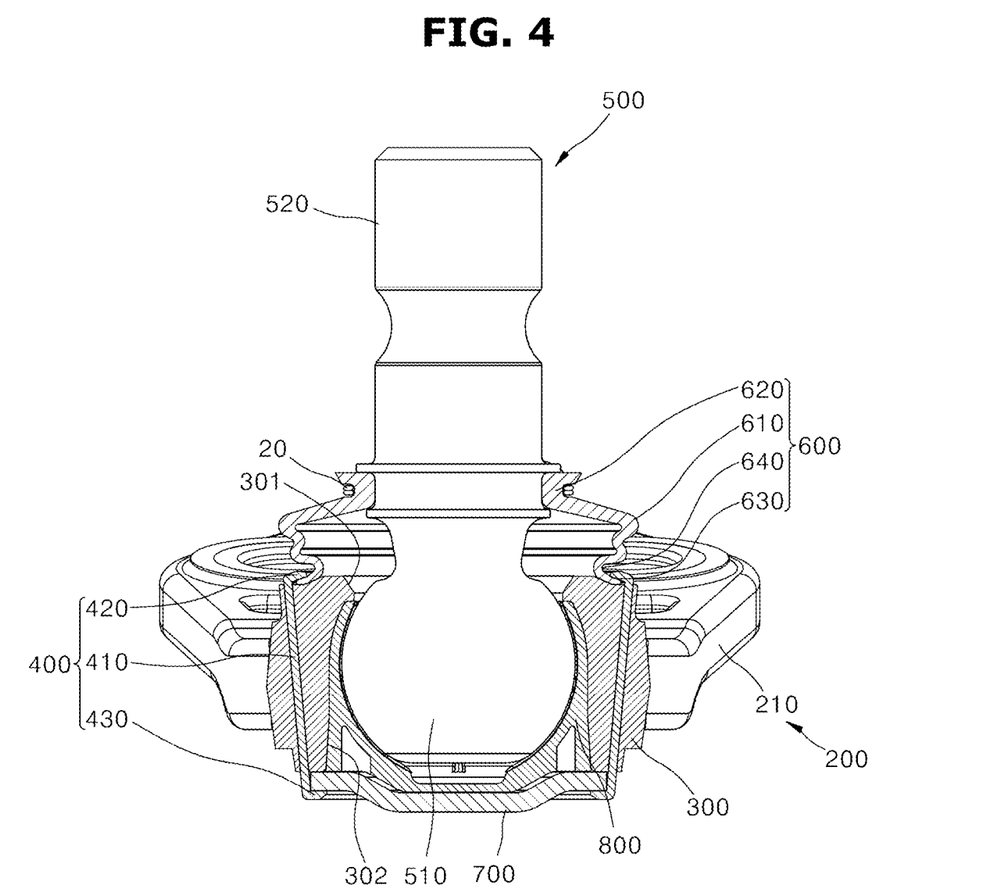
FIG. 4 is a cross-sectional view taken along line IV-IV of FIG. 3.
Figure 5:
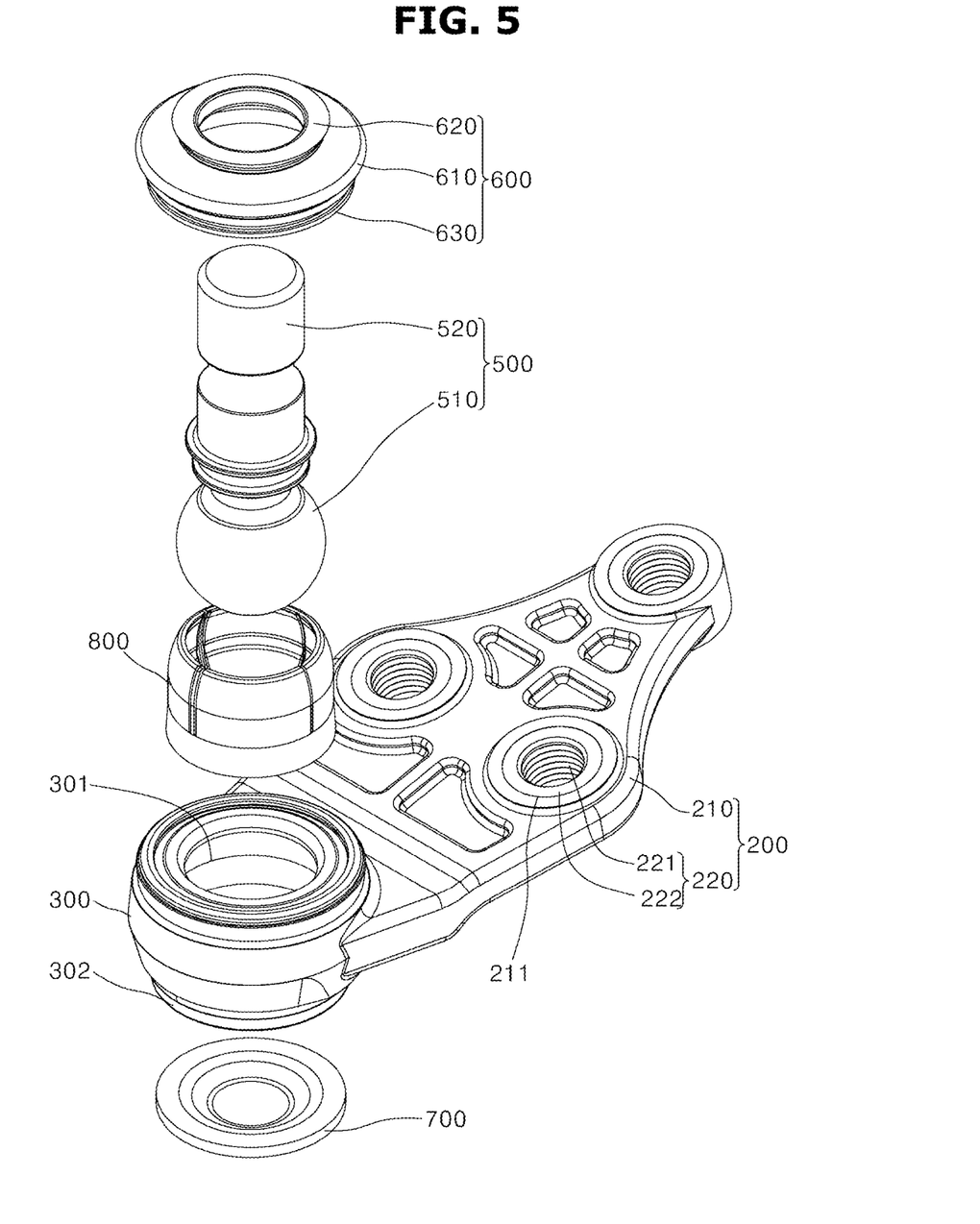
FIG. 5 is an exploded perspective view of FIG. 3.

FIG. 1 is a perspective view showing a configuration of a suspension apparatus for a vehicle according to an embodiment of the present disclosure. FIG. 2 is an exploded perspective view of FIG. 1. FIG. 3 is a perspective view showing a suspension apparatus for a vehicle according to an embodiment of the present disclosure. FIG. 4 is a cross-sectional view taken along line IV-IV of FIG. 3. FIG. 5 is an exploded perspective view of FIG. 3.

Referring to FIGS. 1 to 5, a suspension apparatus for a vehicle according to an embodiment of the present disclosure includes an arm portion 100, a coupling portion 200, a pipe portion 300, a reinforcement portion 400, a ball stud 500, a first cover portion 600, and a second cover portion 700, which will be described in detail as follows.

The arm portion 100 may be made of metal and formed to have at least three end portions. The arm portion 100 may support the load of a wheel by sharing the load with a spring and maintain a smooth ride and steering safety.

The arm portion 100 may be made of aluminum. For example, the arm portion 100 may be formed using an aluminum casting method. In addition, the arm portion 100 may be formed through a press process. The arm portion 100 according to an embodiment of the present disclosure may be exemplified as a lower control arm.

The arm portion 100 may have an arm tapping portion 110. The arm tapping portion 110 may be formed on any one of the three end portions that extend in three directions from the arm portion 100. At least one arm tapping portion 110 may be provided on the arm portion 100. A plurality of arm tapping portions 110 may be spaced apart from each other.

The arm tapping portion 110 may be formed as a hole that passes through the arm portion 100 in the thickness direction. Threads may be formed on the inner peripheral surface of the arm tapping portion 110 through a tapping process.

Figure 7:
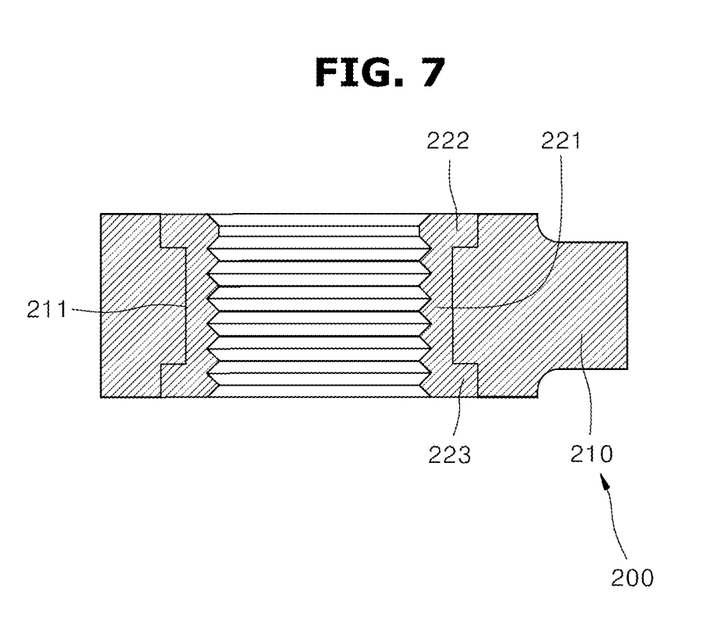
FIG. 7 is a cross-sectional view taken along line VII-VII of FIG. 3.
Figure 8:
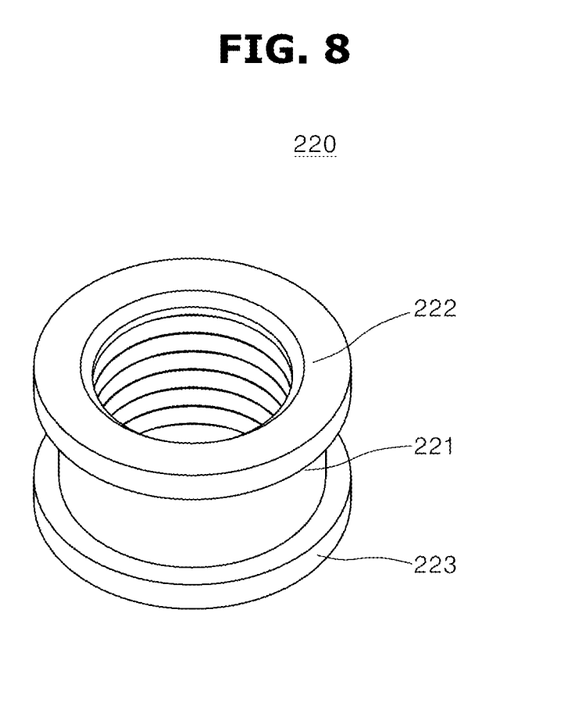
FIG. 8 is a perspective view showing a nut portion in a suspension apparatus for a vehicle according to an embodiment of the present disclosure.

FIG. 7 is a cross-sectional view taken along line VII-VII of FIG. 3. FIG. 8 is a perspective view showing a nut portion in a suspension apparatus for a vehicle according to an embodiment of the present disclosure.

Referring to FIGS. 1 to 8, the coupling portion 200 may be coupled to the arm portion 100. The coupling portion 200 may be bolted to the arm portion 100 by a bolt 10. The coupling portion 200 may include a coupling body portion 210 and a nut portion 220.

The coupling body portion 210 may define the overall outline of the coupling portion 200 and support the pipe portion 300, which will be described below. The coupling body portion 210 may include plastic. In addition, the coupling body portion 210 may be made of an engineering plastic material or may be made of a plastic composite material.

The coupling body portion 210 may have a through-hole portion 211. The through-hole portion 211 may be formed as a hole that passes through the coupling body portion 210 in the thickness direction.

At least one through-hole portion 211 may be provided on the coupling body portion 210. A plurality of through-hole portions 211 may be spaced apart from each other. The through-hole portion 211 may be positioned at a location corresponding to the arm tapping portion 110.

The nut portion 220 may be accommodated inside the through-hole portion 211. The nut portion 220 may be coupled to the coupling body portion 210. Threads may be formed on the inner peripheral surface of the nut portion 220. The bolt 10 may be threaded into the nut portion 220.

The nut portion 220 may include metal. The nut portion 220 may be integrally formed with the coupling body portion 210. The coupling body portion 210 and the nut portion 220 may be insert injection molded.

The nut portion 220 may include a nut body portion 221, a first flange portion 222, and a second flange portion 223.

The nut body portion 221 may be formed in a hollow shape with both ends open.

The first flange portion 222 may be provided on one side (upper side based on FIG. 8) of the nut body portion 221. The first flange portion 222 may be integrally formed with the nut body portion 221. The first flange portion 222 may protrude from an outer peripheral surface of one side of the nut body portion 221 in a radial direction of the nut body portion 221 and may be formed along a circumferential direction of the nut body portion 221. The outer diameter of the first flange portion 222 may be formed to be larger than the inner diameter of the nut body portion 221.

The second flange portion 223 may be provided on the opposite side (lower side based on FIG. 8) of the nut body portion 221. The second flange portion 223 may be integrally formed with the nut body portion 221. The second flange portion 223 may protrude from an outer peripheral surface of the opposite side of the nut body portion 221 in a radial direction of the nut body portion 221 and may be formed along a circumferential direction of the nut body portion 221. The outer diameter of the second flange portion 223 may be formed to be larger than the inner diameter of the nut body portion 221.

A step may be formed between the nut body portion 221 and the first flange portion 222, and a step may also be formed between the nut body portion 221 and the second flange portion 223, thereby increasing the contact area between the outer peripheral surface of the nut portion 220 and the inner peripheral surface of the through-hole portion 211. Accordingly, the nut portion 220 may be firmly secured to the coupling body portion 210.

In addition, since the first flange portion 222 and the second flange portion 223 are formed on both sides of the nut body portion 221, the nut portion 220 may be prevented from being pushed in the opposite direction to the direction of movement of the bolt 10, regardless of the direction of movement of the bolt 10 that is inserted into the nut portion 220 and is threaded into the nut portion 220. In other words, when the bolt 10 and the nut portion 220 are threaded together, the nut portion 220 may be prevented from detaching from the coupling body portion 210.

The pipe portion 300 may be provided in the coupling portion 200. The pipe portion 300 may be integrally formed with the coupling body portion 210. The pipe portion 300 may be made of an engineering plastic material or may be made of a plastic composite material. The coupling portion 200 and the pipe portion 300 may be insert injection molded.

The pipe portion 300 may be formed as a hollow cylinder. The pipe portion 300 may have a first opening portion 301 and a second opening portion 302.

The first opening portion 301 may be provided on one side (upper side based on FIG. 5) of the pipe portion 300 and communicate with the interior of the pipe portion 300. The second opening portion 302 may be provided on the opposite side (lower side based on FIG. 5) of the pipe portion 300 and communicate with the interior of the pipe portion 300.

Figure 6:
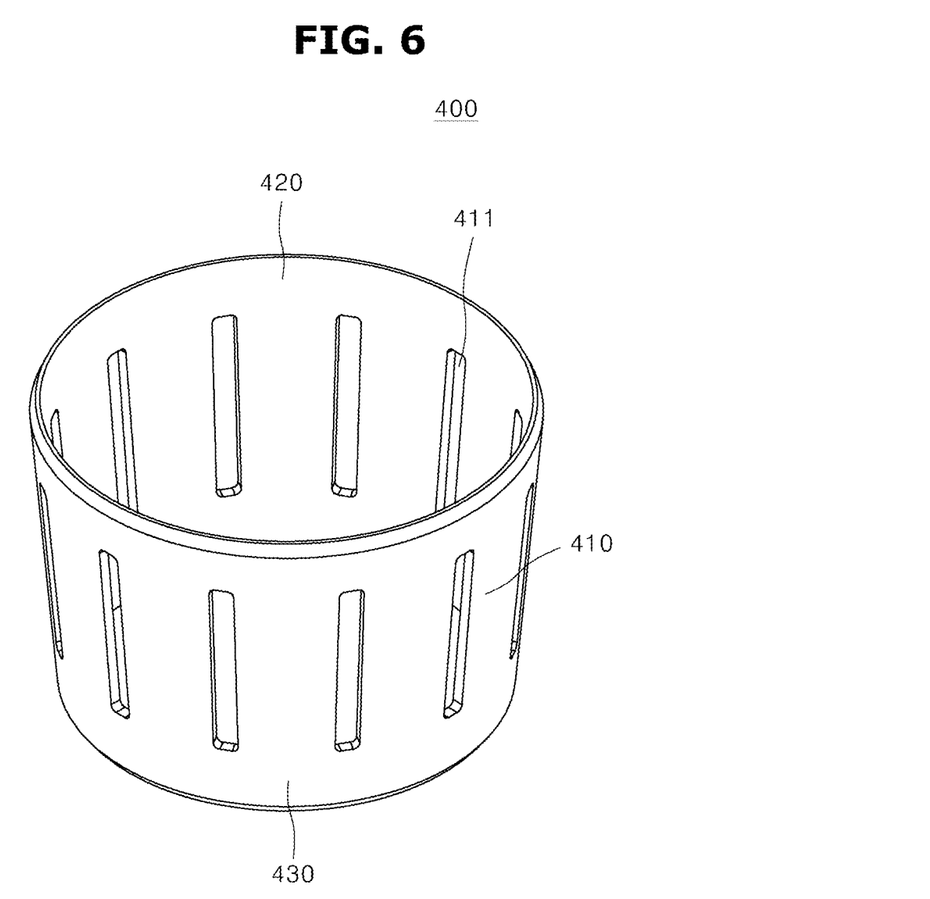
FIG. 6 is a perspective view showing a reinforcement portion in a suspension apparatus for a vehicle according to an embodiment of the present disclosure.

FIG. 6 is a perspective view showing a reinforcement portion in a suspension apparatus for a vehicle according to an embodiment of the present disclosure.

Referring to FIGS. 1 to 8, the reinforcement portion 400 may be provided on the pipe portion 300 to reinforce the rigidity of the pipe portion 300. The reinforcement portion 400 may include metal. The reinforcement portion 400 may be integrally formed with the pipe portion 300. The pipe portion 300 and the reinforcement portion 400 may be insert injection molded. The coupling portion 200, the pipe portion 300, and the reinforcement portion 400 may be insert injection molded.

The reinforcement portion 400 may be made in a shape that optimally reinforces the rigidity of the pipe portion 300 depending on the vehicle model or driving conditions. The reinforcement portion 400 may include a reinforcement body portion 410, a first bending deformation portion 420, and a second bending deformation portion 430.

The reinforcement body portion 410 may define the overall outline of the reinforcement portion 400 and be integrally formed with the pipe portion 300. The reinforcement body portion 410 may be formed in an annular shape. The reinforcement body portion 410 may be non-exposed.

The reinforcement body portion 410 may have a slit hole 411. The slit hole 411 may be formed to pass through the outer peripheral surface of the reinforcement body portion 410. The slit hole 411 may be formed as a long hole oriented along the axial direction of the reinforcement body portion 410. A plurality of the slit holes 411 may be spaced apart along a circumferential direction of the reinforcement body portion 410.

When the pipe portion 300 and the reinforcement body portion 410 are insert injection molded, resin may be filled into the slit hole 411, thereby increasing the bonding strength between the pipe portion 300 and the reinforcement body portion 410.

The first bending deformation portion 420 may extend from the reinforcement body portion 410. The first bending deformation portion 420 may extend in the axial direction of the reinforcement body portion 410 from an end portion of the reinforcement body portion 410 on one side (upper side based on FIG. 4). The first bending deformation portion 420 may protrude from the pipe portion 300 and be exposed. To prevent corrosion of the first bending deformation portion 420 exposed to the outside, the first bending deformation portion 420 may be surface-treated with electrodeposition coating.

The first bending deformation portion 420 may be bent and deformed through a bending process. The first bending deformation portion 420 may be bent through the bending process. The first bending deformation portion 420 may be bent toward the first cover portion 600, which will be described below and apply pressure to the edge of the first cover portion 600. The first bending deformation portion 420 may apply downward pressure to the edge of the first cover portion 600 toward the pipe portion 300, thereby securing the first cover portion 600 to the pipe portion 300.

The first bending deformation portion 420 may be chamfered. The outer peripheral end portion of the first bending deformation portion 420 may be chamfered to be thinner than the thickness of the reinforcement body portion 410, which may facilitate a bending process of the first bending deformation portion 420.

The second bending deformation portion 430 may extend from the reinforcement body portion 410. The second bending deformation portion 430 may extend in the axial direction of the reinforcement body portion 410 from an end portion of the reinforcement body portion 410 on the opposite side (lower side based on FIG. 4).

The first bending deformation portion 420 and the second bending deformation portion 430 may extend in opposite directions from the reinforcement body portion 410. The second bending deformation portion 430 may protrude from the pipe portion 300 and be exposed. To prevent corrosion of the second bending deformation portion 430 exposed to the outside, the second bending deformation portion 430 may be surface-treated with electrodeposition coating.

The second bending deformation portion 430 may be bent and deformed through the bending process. The second bending deformation portion 430 may be bent through the bending process toward the second cover portion 700, which will be described below and apply pressure to the edge of the second cover portion 700. The second bending deformation portion 430 may apply upward pressure to the edge of the second cover portion 700 toward the pipe portion 300, thereby securing the second cover portion 700 to the pipe portion 300.

The second bending deformation portion 430 may be chamfered. The outer peripheral end portion of the second bending deformation portion 430 may be chamfered to be thinner than the thickness of the reinforcement body portion 410, which may facilitate the bending process of the second bending deformation portion 430.

The ball stud 500 may be jointly coupled to the pipe portion 300. The ball stud 500 may be pivotably coupled to the pipe portion 300. The ball stud 500 may be connected to a knuckle of the wheel to support the wheel in conjunction with an upper control arm.

The ball stud 500 may include metal. The ball stud 500 may include a ball portion 510 and a stud portion 520. The ball portion 510 may be formed in a spherical shape and accommodated inside the pipe portion 300. The ball portion 510 may be rotatably accommodated in the pipe portion 300.

The stud portion 520 may extend from the ball portion 510. The stud portion 520 may be formed in a rod or bar shape with a predetermined length. The stud portion 520 may extend from the outer peripheral surface of the ball portion 510 and be exposed from the pipe portion 300 through the first opening portion 301 of the pipe portion 300.

The suspension apparatus for a vehicle according to the embodiment of the present disclosure may further include a ball seat portion 800. The ball seat portion 800 may be interposed between the pipe portion 300 and the ball portion 510 to completely encase the ball portion 510. The ball seat portion 800 may support the ball portion 510 so that the ball portion 510 may rotate smoothly, and compensate for the clearance between the inner peripheral surface of the pipe portion 300 and the outer peripheral surface of the ball portion 510.

The first cover portion 600 may be installed between the stud portion 520 and the pipe portion 300. The first cover portion 600 may be constrained by the reinforcement portion 400 and secured to the pipe portion 300. The first cover portion 600 may cover the first opening portion 301 of the pipe portion 300.

The first cover portion 600 may block foreign substances from entering the inside of the pipe portion 300 through the first opening portion 301. The first cover portion 600 may include an elastically deformable material. The first cover portion 600 may include rubber.

The first cover portion 600 may include a cover body portion 610, a first seating portion 620, a second seating portion 630, and a beading portion 640.

The cover body portion 610 may allow the ball stud 500 to pass through. The cover body portion 610 may be formed in a shape with both sides open to allow the stud portion 520 to pass through. The cover body portion 610 may have an adjustable length. The cover body portion 610 may be formed in a corrugated tube shape.

The first seating portion 620 may be provided on one side (upper side based on FIG. 4) of the cover body portion 610. The first seating portion 620 may be seated on the outer peripheral surface of the ball stud 500 to encase the ball stud 500. In addition, the first seating portion 620 may be seated on the circumferential surface of the stud portion 520 to encase the circumference of the stud portion 520. The first seating portion 620 may be secured to the stud portion 520 by an O-ring 20 that encircles the outer peripheral surface of the first seating portion 620.

The second seating portion 630 may be provided on the opposite side (lower side based on FIG. 4) of the cover body portion 610. The second seating portion 630 may be seated on the pipe portion 300.

The beading portion 640 may be provided between the cover body portion 610 and the second seating portion 630. The beading portion 640 may be recessed in the direction of the central axis of the cover body portion 610. The first bending deformation portion 420, which is bent-processed, may be inserted into the beading portion 640.

The first bending deformation portion 420 may be bent through the bending process and inserted into the beading portion 640, thereby applying downward pressure to the second seating portion 630 toward the pipe portion 300 to secure the second seating portion 630 to the pipe portion 300.

The second cover portion 700 may be installed on the second opening portion 302 of the pipe portion 300. The second cover portion 700 may be constrained by the reinforcement portion 400 and secured to the pipe portion 300. The second cover portion 700 may cover the second opening portion 302. The second cover portion 700 may block foreign substances from entering the inside of the pipe portion 300 through the second opening portion 302.

The second bending deformation portion 430 may be bent through the bending process, thereby applying upward pressure to the edge of the second cover portion 700 toward the pipe portion 300 to secure the second cover portion 700 to the pipe portion 300.

The assembly process of a suspension apparatus for a vehicle according to an embodiment of the present disclosure having the above-described configuration will be described as follows.

Figure 9:
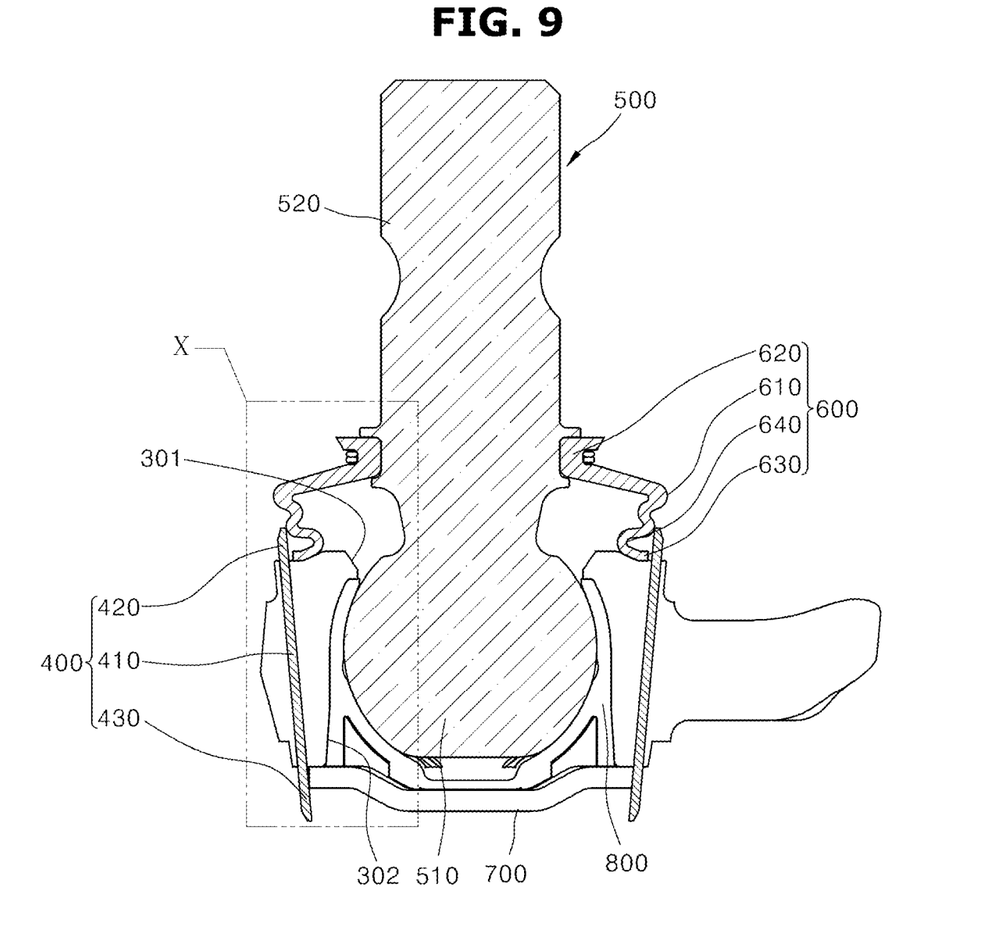
FIG. 9 is a cross-sectional view showing a state of the reinforcement portion in a suspension apparatus for a vehicle before forming according to an embodiment of the present disclosure.
Figure 10:
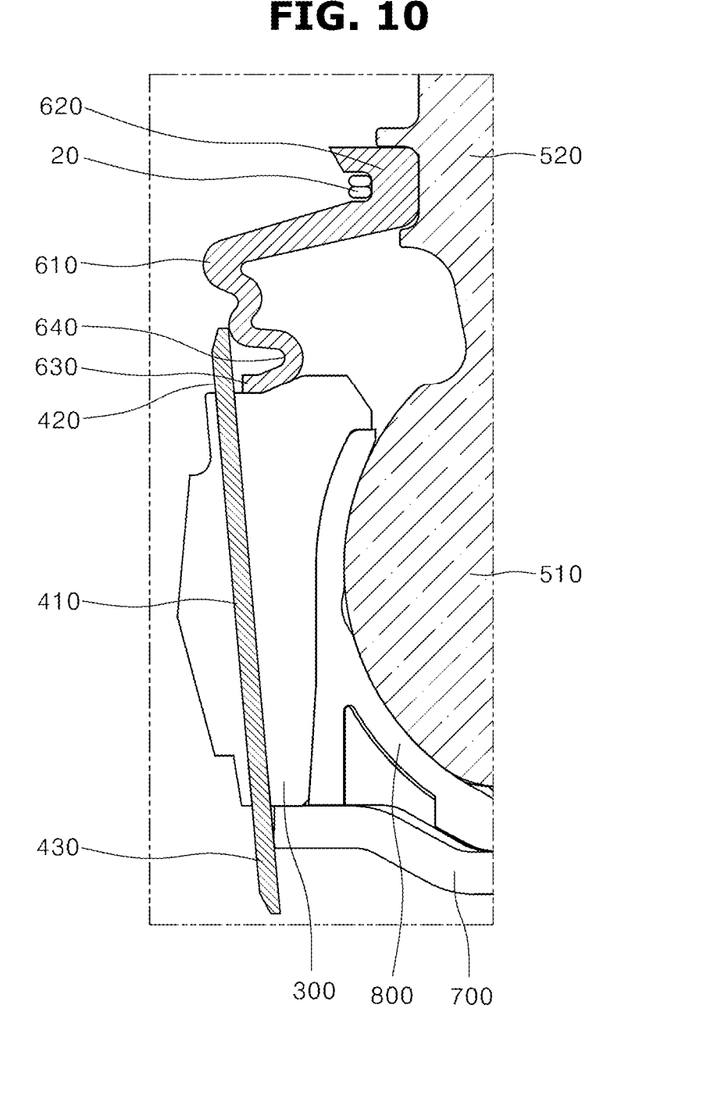
FIG. 10 is an enlarged cross-sectional view of portion "X" of FIG. 9.

FIG. 9 is a cross-sectional view showing a state of the reinforcement portion in a suspension apparatus for a vehicle before forming according to an embodiment of the present disclosure. FIG. 10 is an enlarged cross-sectional view of portion "X" of FIG. 9.

Referring to FIG. 5, FIGS. 9 and 10, the ball seat portion 800, the ball stud 500, the first cover portion 600, and the second cover portion 700 are positioned on the pipe portion 300. The ball seat portion 800 and the ball stud 500 are accommodated inside the pipe portion 300.

The ball portion 510 of the ball stud 500 is accommodated inside the pipe portion 300 and seated on the ball seat portion 800. The stud portion 520 of the ball stud 500 may be exposed from the pipe portion 300 through the first opening portion 301 of the pipe portion 300.

The first cover portion 600 is positioned between the stud portion 520 and the pipe portion 300. The first seating portion 620 of the first cover portion 600 is seated on the outer peripheral surface of the stud portion 520 to encase the stud portion 520, and the first seating portion 620 is secured to the stud portion 520 by the O-ring 20 that encircles the first seating portion 620. The second seating portion 630 of the first cover portion 600 is seated on the pipe portion 300.

The second cover portion 700 is positioned in the second opening portion 302 of the pipe portion 300. The second cover portion 700 covers the second opening portion 302.

Figure 11:
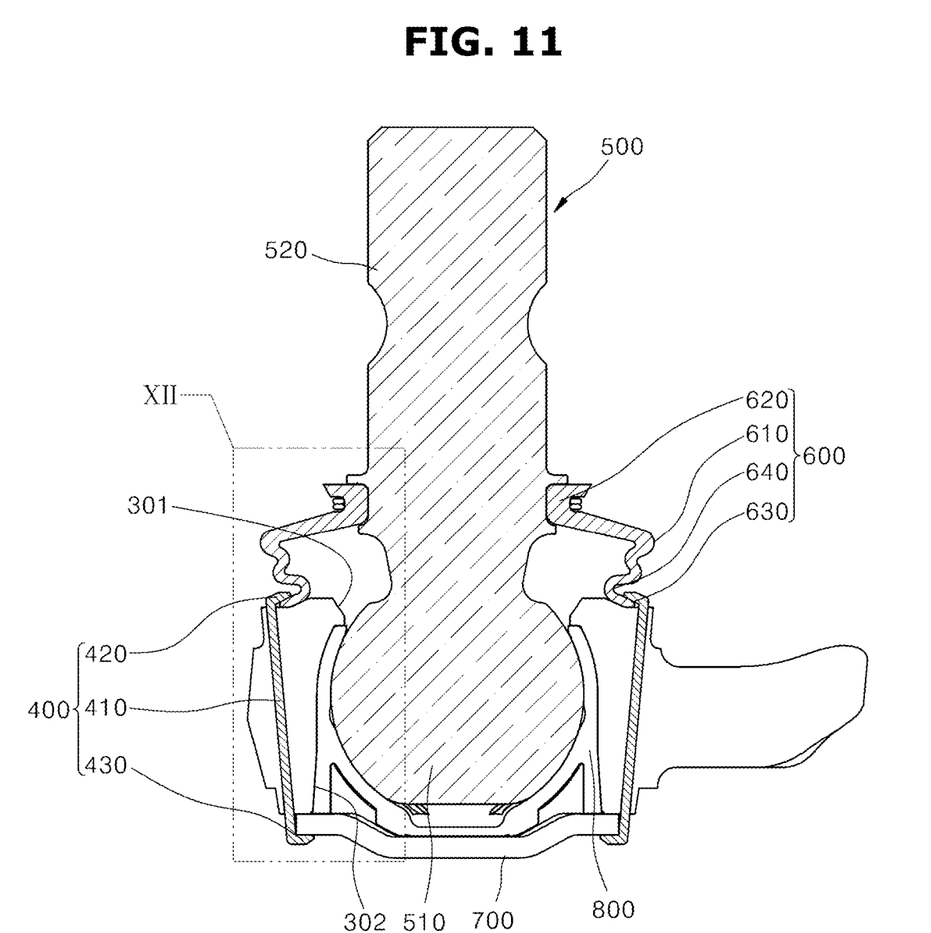
FIG. 11 is a cross-sectional view showing a state of a reinforcement portion in a suspension apparatus for a vehicle after forming according to an embodiment of the present disclosure.
Figure 12:
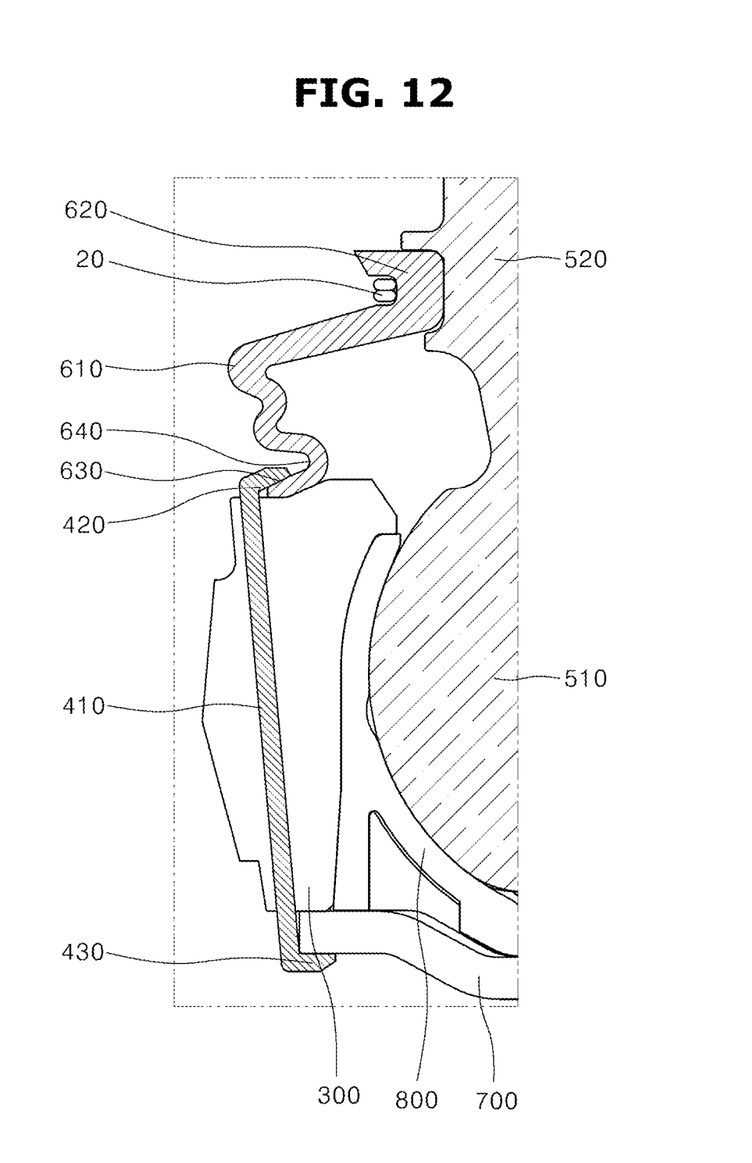
FIG. 12 is an enlarged cross-sectional view of portion "XII" of FIG. 11.

FIG. 11 is a cross-sectional view showing a state of a reinforcement portion in a suspension apparatus for a vehicle after forming according to an embodiment of the present disclosure. FIG. 12 is an enlarged cross-sectional view of portion "XII" of FIG. 11.

Referring to FIG. 5, FIGS. 11 and 12, the first bending deformation portion 420 of the reinforcement portion 400 is bent toward the first cover portion 600 and applies downward pressure to the second seating portion 630 toward the pipe portion 300, thereby securing the second seating portion 630 to the pipe portion 300.

The second bending deformation portion 430 of the reinforcement portion 400 is bent toward the second cover portion 700 and applies upward pressure to the edge of the second cover portion 700 toward the pipe portion 300, thereby securing the second cover portion 700 to the pipe portion 300 and completing the assembly.

In the suspension apparatus for a vehicle according to the embodiment of the present disclosure, the coupling portion 200 is made of plastic, which is bolted to the arm portion 100, and the plastic pipe portion 300 and the metal reinforcement portion 400 are insert injection molded. This increases the rigidity of the components while reducing the weight of the components, thereby improving fuel efficiency and energy efficiency.

In the suspension apparatus for a vehicle according to the embodiment of the present disclosure, the plastic coupling portion 200 and the metal nut portion 220 are insert injection molded, resulting in a reduction in the number of components and processes, thereby reducing manufacturing costs.

In the suspension apparatus for a vehicle according to the embodiment of the present disclosure, the first cover portion 600 and the second cover portion 700 may be firmly secured to the pipe portion 300 through the bending process of the first bending deformation portion 420 and the second bending deformation portion 430, which are provided in the reinforcement portion 400, and the watertightness of the pipe portion 300 may be ensured.

Although embodiments of the present disclosure have been described with reference to the accompanying drawings, these embodiments are for illustrative purposes only, and those skilled in the art will appreciate that various modifications and other equivalent embodiments can be made from these embodiments disclosed herein. Thus, the true technical scope of the disclosure should be defined by the following claims.

What is claimed is:

1. A suspension apparatus for a vehicle, the suspension apparatus comprising:
   an arm portion;
   a coupling portion bolted to the arm portion;
   a pipe portion provided in the coupling portion;
   a reinforcement portion provided on the pipe portion to reinforce rigidity of the pipe portion;
   a ball stud jointly coupled to the pipe portion;
   a first cover portion constrained by the reinforcement portion to be secured to the pipe portion and covering a first opening portion of the pipe portion; and
   a second cover portion constrained by the reinforcement portion to be secured to the pipe portion and covering a second opening portion of the pipe portion.

2. The suspension apparatus of claim 1,
   wherein the arm portion include an arm tapping portion recessed in a predetermined length in a thickness direction of the arm portion, and
   wherein the coupling portion is coupled in the arm tapping portion of the arm portion.

3. The suspension apparatus of claim 1, wherein the pipe portion includes plastic, and the reinforcement portion includes metal.

4. The suspension apparatus of claim 3, wherein the reinforcement portion includes:
   a reinforcement body portion integrally formed with the pipe portion and formed in an annular shape.

5. The suspension apparatus of claim 4, wherein the reinforcement body portion include a slit hole.

6. The suspension apparatus of claim 5,
   wherein the slit hole is in plural, and
   wherein the plurality of the slit holes is spaced apart along a circumferential direction of the reinforcement body portion.

7. The suspension apparatus of claim 4, wherein the reinforcement portion further includes:
   a first bending deformation portion extending from a first end portion of the reinforcement body portion to protrude from the pipe portion and configured for bending and deformation.

8. The suspension apparatus of claim 7, wherein the first bending deformation portion is bent toward the first cover portion to apply pressure to an edge of the first cover portion.

9. The suspension apparatus of claim 8, wherein the first bending deformation portion is chamfered.

10. The suspension apparatus of claim 4, wherein the reinforcement portion further includes:
    a second bending deformation portion extending from a second end portion of the reinforcement body portion to protrude from the pipe portion and configured for bending and deformation.

11. The suspension apparatus of claim 10, wherein the second bending deformation portion is bent toward the second cover portion to apply pressure to an edge of the second cover portion.

12. The suspension apparatus of claim 10, wherein the second bending deformation portion is chamfered.

13. The suspension apparatus of claim 10, wherein the first cover portion includes:
    a cover body portion that allows the ball stud to pass through and has an adjustable length;
    a first seating portion provided on one side of the cover body portion and seated on an outer peripheral surface of the ball stud to encase the ball stud;
    a second seating portion provided on an opposite side of the cover body portion and seated on the pipe portion; and
    a beading portion provided between the cover body portion and the second seating portion and recessed in a direction of a central axis of the cover body portion to allow insertion of the second bending deformation portion.

14. The suspension apparatus of claim 1, wherein the coupling portion includes:
    a coupling body portion that has a through-hole portion; and
    a nut portion accommodated in the through-hole portion and coupled to the coupling body portion.

15. The suspension apparatus of claim 14, wherein the coupling body portion includes plastic, the nut portion includes metal, and the nut portion is integrally formed with the coupling body portion.

16. The suspension apparatus of claim 15, wherein the nut portion includes:
    a nut body portion;
    a first flange portion provided on one side of the nut body portion and protruding in a radial direction of the nut body portion; and
    a second flange portion provided on an opposite side of the nut body portion and protruding in a radial direction of the nut body portion.

17. The suspension apparatus of claim 1, wherein the ball stud includes:
    a ball portion accommodated in the pipe portion; and a stud portion extending from the ball portion and being exposed from the pipe portion through the first opening portion.

18. The suspension apparatus of claim 17, further including a ball seat portion interposed between the pipe portion and the ball portion and encasing the ball portion.

\* \* \* \* \*